Mar. 3. 1925.

Re. 16,014

E. E. WEMP

CLUTCH

Original Filed May 19, 1921 3 Sheets-Sheet 1

INVENTOR.
Ernest E. Wemp

BY
Stuart C. Barnes
ATTORNEY.

Mar. 3. 1925.

Re. 16,014

E. E. WEMP

CLUTCH

Original Filed May 19, 1921 3 Sheets-Sheet 2

INVENTOR.
Ernest E. Wemp

BY Stuart C. Barnes
ATTORNEY.

Mar. 3, 1925.

Re. 16,014

E. E. WEMP

CLUTCH

Original Filed May 19, 1921 3 Sheets-Sheet 3

INVENTOR.
Ernest E. Wemp

BY
Stuart C. Barnes
ATTORNEY.

Reissued Mar. 3, 1925. Re. 16,014

UNITED STATES PATENT OFFICE.

ERNEST E. WEMP, OF DETROIT, MICHIGAN.

CLUTCH.

Original No. 1,485,319, dated February 26, 1924, Serial No. 470,851, filed May 19, 1921. Application for reissue filed July 9, 1924. Serial No. 725,057.

*To all whom it may concern:*

Be it known that I, ERNEST E. WEMP, a citizen of the United States, and a resident of Detroit, Wayne County, Michigan, have invented certain new and useful Improvements in Clutches, of which the following is a specification.

This invention relates to clutches of the multiple disc type. It has for its object an improved clutch provided with a number of features which make for improved clutch action and economy in manufacture.

Among these features is an arrangement of self-spacing and positioning discs. These discs are so constructed that they are locally flexible in sections around the periphery, thereby making the clutch self-adaptable to variations and misalignment of the driving and driven shafts.

The clutch is designed to quickly dissipate the heat that is generated in the discs and which in a great many clutches causes the deterioration of the disc facings, especially in the center discs.

The pressure member or disc packing member is an entirely novel construction and very economical to manufacture. It is a simple stamping from a single sheet of material and eliminates the necessity of separate levers and pins that are used in other clutches of this type. The lever parts of this disc fulcrum on a yieldable abutment which gives the clutch a very gentle and smooth action in taking hold as distinguished from the grabbing action found in many clutches.

The clutch spring, clutch thrust collar, clutch spring housing, pressure disc, yieldable abutment and one of the driving discs are all tied together in a single assembly by bolts and springs which permits the parts to be easily handled and prevents the driving disc from rapping against the pressure disc when disengaged.

These and other features will be explained in detail as the parts are specifically described.

The fly wheel is designated *a* and is bolted to the crankshaft *b* which is supposed to be in accurate alignment with the driven or cutch shaft *c*. A purality of studs *d* are secured to the fly wheel and on these are slidably secured the driving discs *e* which are preferably of metal. There are three of these driving discs, but of course the number of them might be varied. *f* indicates a splined sleeve which is splined onto the end of the driven or clutch shaft *c*. A pair of driven discs *g* are bolted one to each end of the collar portion *h* of this splined sleeve. Each one of these driven discs has on its two opposite sides a clutch facing *i* of suitable composition material containing asbestos or other heat-resisting material.

It will be noticed that the adjacent face of the fly wheel acts as one of the clutch faces of this clutch. One driven disc engages between this fly wheel face and a pair of driving discs which are permanently fastened together and spaced. The other driven disc engages between this latter set of driving discs and the rear driving disc 4. One of the great faults in multiple disc clutches is that the center discs deteriorate due to the excessive heat developed and the lack of facility for dissipation of this heat. The disc facings are impregnated with a material that becomes fluid when a high temperature is developed and this oozes out of the facing and collects on the opposite metal disc. When the heat has abated it hardens and forms an abrasive which cuts into the opposite clutch facing and tears it. The design and arrangement of clutch discs that I have just described obviates this trouble. In the first place, the driving discs or rings are of considerably larger diameter than the driven discs thereby providing widely spaced fins at the periphery of these driving discs which act as cooling fins due to the fact that they are rotated at high velocity in a position where the air may strike them and cool the same. By using a pair of discs at the center of the driving discs and spacing this pair of discs obviously this pair of discs, which would ordinarily get the hottest, is well equipped to dissipate the heat for it not only has only a single face of each disc exposed to the friction of the driven discs, but there is an air cooling space left between the two discs. Obviously the fly wheel and the rear driving disc are well equipped to carry away the heat as they meet friction only on one face and are free on one side to be cooled by the air.

Figure 4:
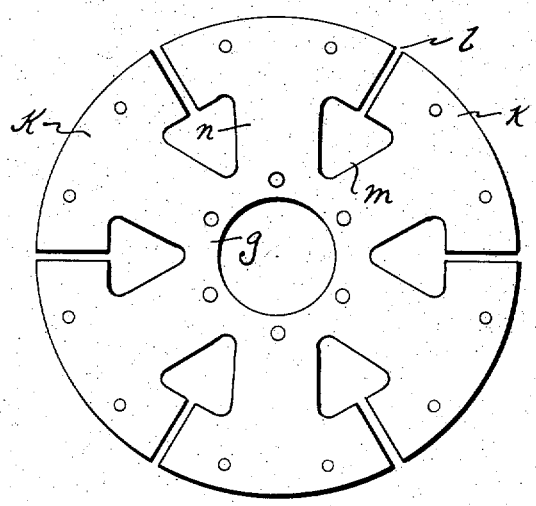
Fig. 4 is a detail of one of the self-spacing and locally-flexible driven discs.

The driven discs are one of the novel features of this clutch. Instead of being made up as solid discs they are divided into segments *k* by the slots *l* (Fig. 4) which are narrow along the outer zone of the disc but are relatively wide at the middle zone of the disc, forming triangular slots *m*. This leaves relatively flexible neck portions *n* connecting the outer portions of the segments so as to make the segments very flexible. These discs are constructed of spring steel. This flexible segment construction makes the disc locally flexible in sections, which accomplishes a very important function in the action of the clutch. Very often the crankshaft is not in true alignment with the driven shaft. This is due to errors in machining or to the taking up of the bearings on the crankshaft. This obviously throws the fly wheel face out of a true position of parallelism with the driven discs and also throws the driving discs out of parallelism with the driven discs. The consequence is that the driven discs tend to bear more heavily at one side of the shaft than at the other. This, of course, does not result in efficient clutch action and also tends to wear the splines on the clutch shaft. This difficulty is obviated by my construction in which the driven discs are divided into numerous segments which makes them locally flexible. The consequence is, one set of discs being flexible, obviously no ordinary misalignment of the shafts will make any difference in the clutch operation as the clutch discs in packing can adapt themselves to this lack of parallelism. Furthermore, when the clutch discs in the ordinary clutch are released there is no means of properly spacing and positioning them so that they do not drag on one another. In my construction, the driven discs being constructed as they are of spring steel and flexible along their outer zone, obviously they can easily separate from the other set of discs and assume their ordinary position when the pressure upon the discs is released for each of these driven discs is permanently spaced where they are fastened to the splined sleeve *f*. The driven discs at their peripheries, when not under pressure, are spaced from each other a distance greater than the width of the permanently-spaced driving discs *e*. The flexible neck portion *n* formed by the triangular slot *m* forms what I call a "spoked" flexible clutch disc. These spokes terminate in enlarged clutch-facing carrying segments *k* to which is riveted a clutch facing material *i*. This construction is important. With straight radial slots the flexing and bending line of the segment will be at the ends of the slots at the narrowest point of the converging segment, hence all the bending strains will be constantly in this line and the result is that the metal will soon crystallize and break. This is a familiar action with flat springs where there is a hinging action always along a single line. With the enlarged slots *m* a relatively long neck portion or spoke of substantially uniform cross section is afforded and consequently the fibre stresses are distributed along the entire length of the spoke, making not only for an easier flexing action but distributing the bending strains along the entire spoke length and insuring the permanent life of the segment.

Furthermore, I find that by actual observance and experiment that a disc construction with enlarged slots to form spokes is not only flexible in a direction transverse to the plane of the disc, but the segments are capable of limited flexing action in the plane of the disc notwithstanding what appears to be a considerable cross section in this direction. This has a very useful function in connection with absorbing inertia and differential forces existing in the driving and driven parts. With ordinary clutches not capable of yielding in the direction indicated, these forces result in a chattering action which is entirely eliminated with my clutch.

Figure 1:
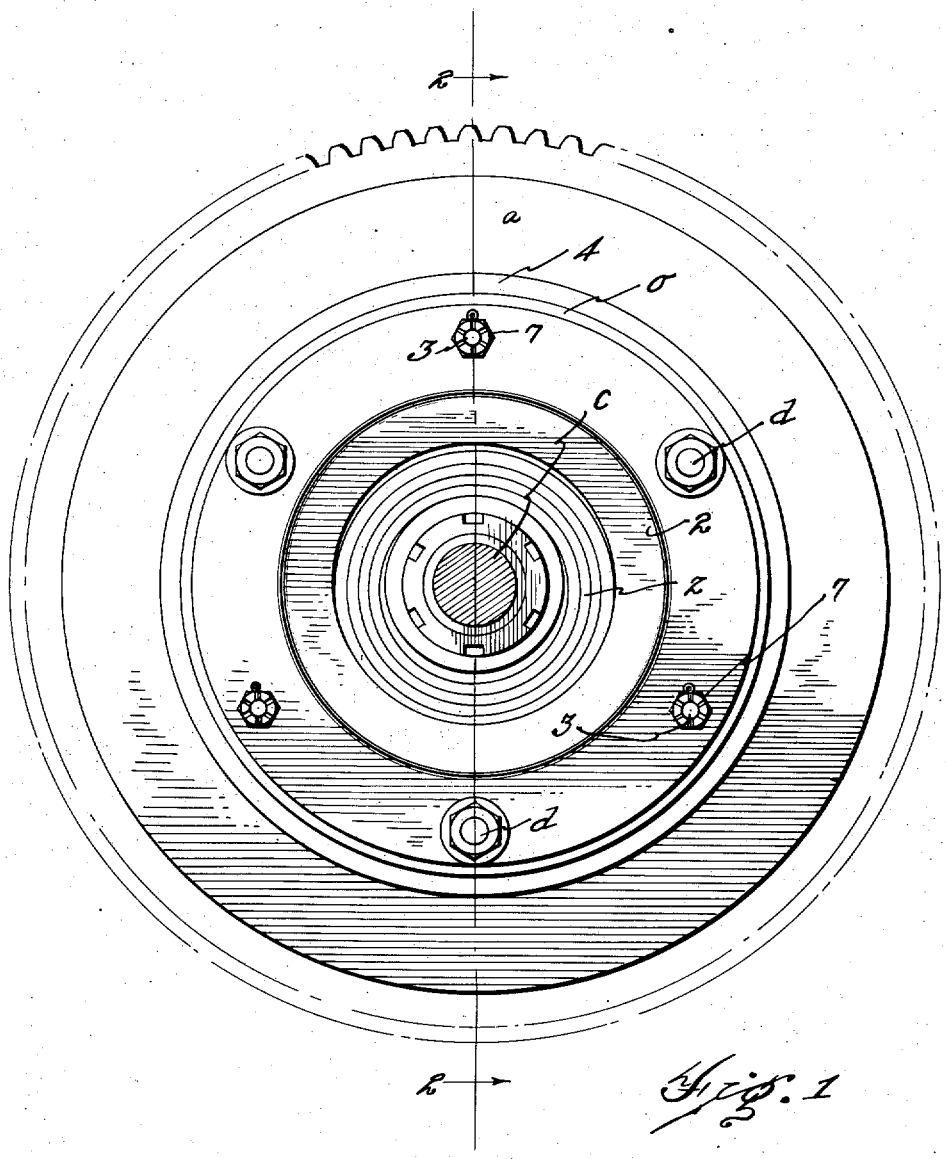
Fig. 1 is an elevation of the clutch looking forward along the driven shaft.
Figure 2:
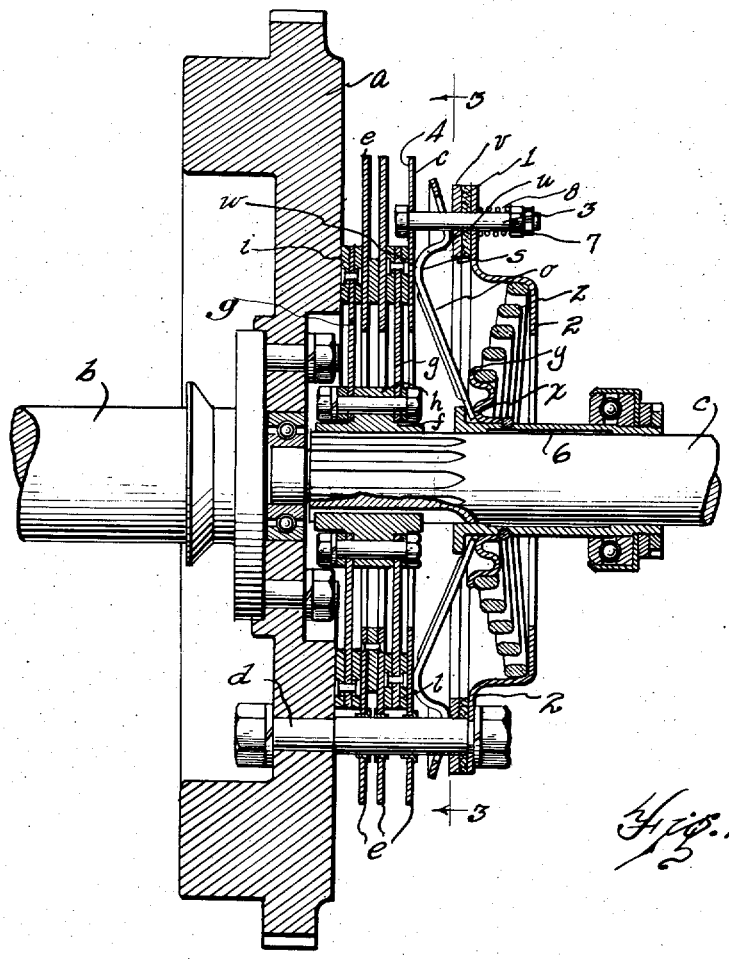
Fig. 2 is a longitudinal section of the same on the line 2—2 of Fig. 1.
Figure 3:
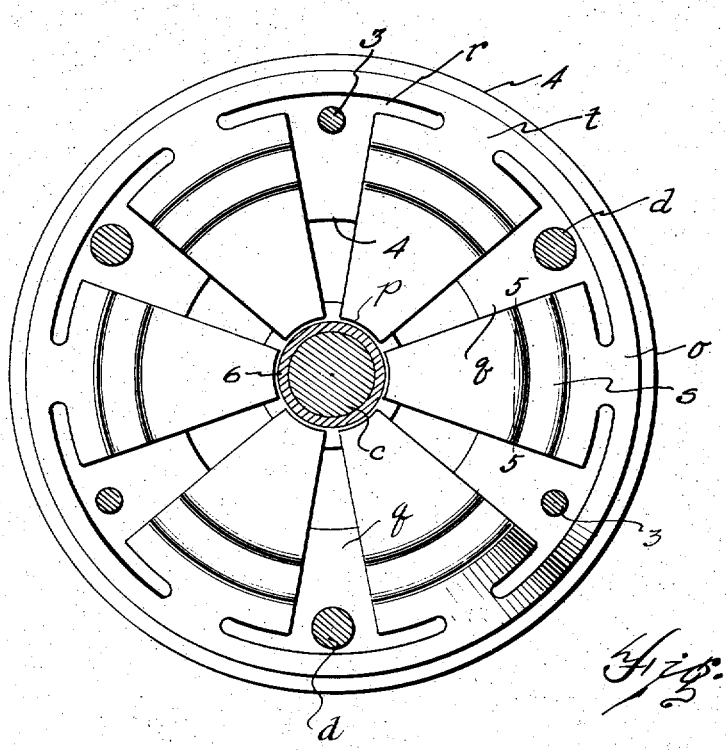
Fig. 3 is a section on the line 3—3 of Fig. 2.
Figure 5:
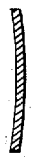
Fig. 5 is a section on the line 5—5 of Fig. 3.

Pressure is applied to the clutch discs to pack them by what I believe to be an entirely novel method, namely, the packing or pressure member *o*. This is detailed in Fig. 3. The disc is made up of a center perforation with a plurality of T-shaped slots extending radially outward but short of the periphery. This disc is provided with a deep annular corrugation *s* near the periphery. The center of the disc is pressed rearwardly, as is evident from Fig. 2, making this portion conical. The disc is made of spring steel and is a stamping. The disc is formed after having been heated and is tempered by being quenched in oil when held firmly between two dies to prevent any distortion. The material between the two slots of this disc forms a lever which has a convexo-concave section—see section 5—5 of Fig. 3. This convexo-concave construction prevents the segments or levers flexing and brings the hinging line of the same in the neck portion *t* of the levers or segments at the point or line *u* (Fig. 2) where the disc abuts against the metal abutment ring *v*. This is also the fulcrum point of the lever. The resistance point is at *w* or where the annular corrugation abuts against the rear driving disc 4. The point of application of the power is at $x$ where the thrust collar $y$ of the clutch spring $z$ engages the end of the lever or the apex of the segments. This makes the segments or levers of the second order. The drawing shows substantially five to one ratio of length of power arm to resistance arm. This enables a less force traveling through a greater distance to operate to pack the discs than would be the case if the thrust were a direct one without any advantage of levers. Of course, this broad operation is not new. However, I do believe that the design of this pressure element, whereby a single stamping provides not only the packing ring but the levers, is new and obviously it results in very much cheaper construction.

Furthermore, each one of these segments or levers provides a local thrust to the discs and each segment or lever fulcrums on an abutment ring $v$ which is cushioned by the slow action yielding cushion 1 placed between the abutment ring $v$ and the clutch spring housing 2. This cushion is preferably a cork ring. This gives a clutch action which is very smooth and no grabbing or jerking occurs.

It will be noticed that the bolts 3 secure the rear driving disc 4 (which is referred to in the claims as a thrust ring), the pressure disc $o$, the abutment ring $v$, the cork ring 1, the clutch spring abutment 2, the clutch spring $z$, the thrust collar $y$, and the clutch-shifting sleeve 6, together. Interposed between the castellated nuts 7 on the outer ends of the bolts and the clutch housing are coiled spacing springs 8. The bolts, nuts and springs secure all these members together as a unit. This makes a convenient assembly with the clutch spring $z$ under compression. This assembly can be mounted as a unit on the driven shaft and then bolted to the fly wheel by the driving studs $d$. Furthermore, the springs 8 hold the rear metal driving disc in yielding contact with the pressure disc so as to prevent any vibration or rapping between the two.

In some of the claims the fly wheel is made an element of the claim. It is to be understood that the fly wheel is here used in the sense of a large driving member and that any member which would perform the same function in the combination claimed is considered an equivalent.

It will be obvious that a great deal of the structure claimed in the appended claims is applicable to the so-called single plate clutch as well as the so-called multiple disc clutch, namely,—the driven disc construction, the lever disc construction for transmitting thrust, and means for cushioning the lever action, and the sub-assembly unit consisting of the thrust ring, spring housing, spring, etc. It is also evident that the so-called single plate clutch or single disc clutch is technically a misnomer for the reason that any disc clutch requires a plurality of discs or members which are clear equivalents of discs. The ordinary form of the single plate clutch includes two driving discs, namely, the fly wheel and the pressure plate, and a single driven disc; it is therefore in this broader significance that I use the reference to a plurality of discs in the claims, unless the claim is so limited elsewhere as to unmistakably show that the claimed structure is contemplated only in the strictly multiple disc clutch where a plurality of driven discs are employed.

As already stated above, the segments are capable of a limited flexing action in the plane of the disc, or in what might be called the torque plane. Obviously these spokes transmit the torque from the periphery of the disc to the driven shaft at the center. It is therefore desirable to have the bending stresses due to the transmission of this torque concentrated over as wide an area as possible, and the weakest portion of the segment as far removed from the center of the disc as possible. In the simple straight slotted disc, or what might be called simply a slitted disc, obviously the weakest point in the disc is the narrowest portion at the base of the slots. By reason of the radial converging slots all the bending stresses due to the transmission of the torque are concentrated at the very base of the segment, as these slots are relatively long and come near to the center of the disc. These bending stresses are greatly augmented due to the leverage of the applied load. For instance, if the load is communicated to the disc near the outside of the disc, an equal force in the opposite direction communicated to the disc at the same point will just balance the load effort but as one travels in toward the center of the disc a corresponding larger force is required to counterbalance the load effort. In short, this demonstrates that the strain on the weakest point of resistance to the torque effort is much greater where such weak portion is near the center, and it is still much greater when this bending stress is concentrated to a small area of the segment immediately adjacent the center of the disc.

By enlarging the slots at a point somewhat remote from the periphery of the disc, this gives the portions of the disc between the face carrying portions and the center web approximately a spoke construction. This tends to interpose the middle of the weakest portion of the segment at a point somewhat removed from the center of the disc to therefore lessen the bending moment of the torque stresses, and further, instead of concentrating the bending stresses due to the torque to almost a line as is the case with two converging straight slots, these bending stresses are distributed over considerable area of the segment, which is much better calculated to resist these strains.

These considerations are important considerations in the design of a sheet metal, relatively thin disc. While it may appear that when considered in the direction of the plane of the disc, there is considerable thickness, nevertheless these constant bending stresses due to the heavy torque load will in the course of time tend to crystalize the metal if they are not lessened as much as may be, and if they are not distributed over a considerable section.

My design of disc is calculated to accomplish both these ends and therefore make possible the practical use of a slotted, thin metal disc in transmitting heavy torque loads without any material danger of the disc crystalizing and becoming useless.

What I claim is:

1. In a clutch of the type described, a plurality of discs, some of which are slotted from the periphery inward and radially with slots enlarging toward the center to provide flexible spoked spring segments which permit the disc to be locally flexed and returned to its normal position when the pressure is released.

2. In a clutch of the type described, the combination of a fly wheel provided with a clutch face, a rear driving disc, a pair of driven discs provided with clutch facings on each side, one of the facings engaging the face of the fly wheel and another the front face of the rear driving disc, and a pair of driving discs spaced but united and engaging between the remaining clutch facings of the two driven clutch discs.

3. In a clutch of the type described, a set of clutch discs provided with clutch facings, and a second set of clutch discs some of which are united but spaced and are provided with outwardly-extending portions beyond the other set of clutch discs for the purpose of providing air-cooling fins.

4. In a clutch of the type described, a plurality of discs some of which are "spoked" discs having at the outer ends of the spokes enlarged facing-carrying segments.

5. In a clutch of the type described, the combination of a plurality of discs, a clutch spring, and means for transmitting thrust comprising a flexing integral disc having a convexo-concaved annular portion which acts as a load-receiving portion, and a conical interior portion which acts as the power-receiving portion.

6. In a clutch of the type described, the combination of a plurality of discs, a clutch spring, and means for transmitting thrust in connection with said discs, comprising an integral disc having an annular convexo-concaved portion acting as the load-receiving portion, and a conical interior portion acting as the power-receiving portion, and an abutment which the outer portion of the disc engages against to fulcrum in the flexing of the disc parts.

7. In a clutch of the type described, the combination of a plurality of discs, a clutch spring, and means for transmitting thrust in connection with said discs, said means comprising an integral disc made up of a plurality of flexing segments having convexo-concaved portions adapted to act as the load-receiving portions, the inner ends of said segments acting as power-receiving portions, and an abutment against which the outer ends of the segments engage to fulcrum.

8. In a clutch of the type described, a plurality of discs, a clutch spring, means for transmitting thrust in connection with said discs, comprising an integral disc formed with an annular convexo-concaved portion, and a conical interior portion and divided into flexing segments by slots, and an abutment against which the outer portion of the disc engages to fulcrum while the convexo-concaved portion acts as the load-receiving portion and the interior portion acts as the power application portion.

9. In a clutch of the type described, the combination of a plurality of discs, a clutch spring, and a disc formed into a conical but perforated interior portion and a plurality of segments extending from the perforated center outward and each segment having a convexo-concaved cross section, said disc having a convexo-concaved annular portion acting as the load-receiving portion while the outer portion of the disc acts as a fulcrum and the inner ends of the segments act as the power application points.

10. In a clutch of the type described, the combination of a plurality of discs, a clutch spring, and a pressure disc comprising a stamping having slots extending outwardly from a center perforation and formed near the periphery with an annular convexo-concaved portion adapted to abut against the said plurality of discs while the outer zone of the disc acts as a fulcrum, the interior of the disc being conical and arranged to take the thrust of the clutch spring, and a yieldable abutment for the fulcrum portion of the disc.

11. In a clutch of the type described, the combination of a plurality of discs, a clutch spring and a thrust member including a plurality of levers fulcrumed at their outer ends, and yieldable means upon which said levers fulcrum.

12. In a clutch of the type described, the combination of a plurality of discs, a clutch spring, and a pressure member for conveying the thrust of the clutch spring to the discs including a plurality of levers fulcruming at their outer ends, and a slow action cushion member for said levers to fulcrum upon.

13. In a clutch of the type described, the combination of a plurality of discs, a clutch spring, and a pressure member for conveying the thrust of the clutch spring to the discs and including a plurality of levers of the second order, and a yieldable ring serving to cushion the fulcrum support for said levers.

14. In a clutch of the type described, the combination of a plurality of discs, a clutch spring, and means for conveying the thrust of the clutch spring to the discs including a plurality of levers, a metal ring on which the said levers fulcrum, and a ring of cork under the metal ring to provide a yieldable fulcrum for the said levers.

15. In a clutch, the combination of a fly wheel, a plurality of driving studs secured thereto, a plurality of driving discs slidably secured on said driving studs, a driven shaft, a sleeve splined on the end of the driven shaft, and a plurality of flexible radially slotted driven discs removably secured on said sleeve in permanently spaced relation with some of the driving discs between the driven discs, and means for exerting thrust to pack the discs.

16. In a clutch, the combination of a fly wheel, a plurality of driving studs secured to the flywheel, a plurality of driving discs slidably secured on the studs, a driven shaft, a sleeve splined on the end of the driven shaft and provided with a collar portion, a pair of radially slotted flexible driven discs with a driving disc therebetween, bolts for removably securing the driven discs in permanently spaced relation on opposite sides of the collar portion of the sleeve, the said driven discs arranged to engage the driving discs when the discs are packed, and means for packing the discs.

17. In a clutch, the combination of a fly wheel, a plurality of driving studs secured to the fly wheel, a plurality of driving discs slidably secured on the studs, a driven shaft, a sleeve splined on the driven shaft, a plurality of flexible driven discs secured to the sleeve in permanently spaced relation, the outer portions of said discs having clutch facings arranged to engage between the several driving discs and also between one of the driving discs and the face of the fly wheel, and means for exerting spring pressure on the discs to pack them.

18. A clutch, having in combination a fly wheel, driving studs carried by the fly wheel, a plurality of driving and driven discs, and a clutch assembly unit cooperating with said discs but an independent assembly and removably secured to the ends of the driving studs, said unit including an abutment, thrust ring, and a thrust-producing means between the abutment and the thrust ring.

19. A clutch, having in combination, a fly wheel, a plurality of driving studs carried thereby, driving and driven discs, and a clutch assembly unit cooperating with said discs but an independent assembly removably secured on the ends of the driving studs, said unit including an abutment, thrust ring, clutch spring, and thrust-transmitting member.

20. A clutch, having in combination a fly wheel, a plurality of driving studs carried thereby, driving and driven discs, and a clutch assembly unit cooperating with the said discs but an independent assembly and removably secured on the ends of the driving studs, said unit including an abutment, a thrust ring, a spring and a thrust-transmitting member, and bolts and nuts for removably bolting these parts together as one assembly.

21. A driven disc for a clutch, comprising an approximately circular sheet of metal blanked to provide a plurality of segments by openings cut in part way toward the center from the periphery, said openings enlarged at a point removed from the periphery to provide relatively large facing-carrying portions connected with the uninterrupted web at the center of the disc by relatively narrow neck portions that are calculated to more evenly distribute the bending stresses over the entire neck portion of the segment.

22. A disc for a plate or disc type of clutch, comprising a thin sheet metal plate provided with means for taking the clutching action on the side face or faces of the plate, the said plate approximating the same thickness at the periphery as elsewhere, and the said plate being slotted inwardly from the periphery with slots that enlarge at locations inwardly removed from the periphery, whereby "spokes" are formed to connect the center of the disc with the enlarged working segments near the periphery.

23. A disc for a plate or disc type of clutch, comprising a relatively thin sheet metal disc approximating a flat condition all over, and the said plate being slotted inwardly from the periphery with slots that are materially enlarged intermediately inward from the outside of the disc for the purpose of preventing a concentration of strains in a limited area and for removing the weakest points of the segments away from the center of the disc.

In testimony whereof, I have affixed my signature.

ERNEST E. WEMP.